(12) United States Patent
Davis

(10) Patent No.: US 8,578,976 B1
(45) Date of Patent: Nov. 12, 2013

(54) RAIN WATER COLLECTION SYSTEM

(76) Inventor: Stephen D. Davis, Waterdown (CA)

( * ) Notice: Subject to any disclaimer, the term of this patent is extended or adjusted under 35 U.S.C. 154(b) by 993 days.

(21) Appl. No.: 12/638,183

(22) Filed: Dec. 15, 2009

Related U.S. Application Data

(60) Provisional application No. 61/201,579, filed on Dec. 15, 2008.

(51) Int. Cl.
*B01D 35/16* (2006.01)
*E04D 13/04* (2006.01)

(52) U.S. Cl.
USPC ............... 141/86; 141/2; 141/341; 137/360; 52/12; 52/16

(58) Field of Classification Search
USPC ........... 141/2, 18, 85–86, 331–332, 340–341; 52/11–12, 16; 137/356–357, 360
See application file for complete search history.

(56) References Cited

U.S. PATENT DOCUMENTS

| | | | | |
|---|---|---|---|---|
| 543,922 A | * | 8/1895 | Buckley | 210/249 |
| 1,460,613 A | * | 7/1923 | Sill | 137/373 |
| 2,814,529 A | | 11/1957 | Arnt | |
| 3,870,605 A | * | 3/1975 | Sakamoto | 202/234 |
| 4,161,186 A | | 7/1979 | Sitarz | |
| 4,718,452 A | * | 1/1988 | Maitland | 137/592 |
| 4,726,151 A | * | 2/1988 | Vitale | 52/16 |
| D326,705 S | * | 6/1992 | Vanden burg et al. | D23/205 |
| 5,220,755 A | * | 6/1993 | Roles | 52/16 |
| 5,239,794 A | * | 8/1993 | Klein | 52/169.6 |
| 5,396,745 A | * | 3/1995 | Klein | 52/169.6 |
| 5,407,091 A | * | 4/1995 | Wallis | 220/565 |
| 5,730,179 A | | 3/1998 | Taylor | |
| 5,735,304 A | | 4/1998 | Chumley | |
| 5,985,158 A | * | 11/1999 | Tiderington | 52/12 |
| 6,357,183 B1 | | 3/2002 | Smith | |
| 6,526,700 B1 | | 3/2003 | Pilcher | |
| 6,553,723 B1 | | 4/2003 | Alcorn | |
| 6,647,670 B1 | | 11/2003 | Dran | |
| 6,832,635 B2 | * | 12/2004 | Kruger | 141/115 |
| 6,887,375 B2 | | 5/2005 | Johnson | |
| 6,941,702 B1 | | 9/2005 | Abrams et al. | |
| 6,966,333 B1 | | 11/2005 | Kuehneman | |
| D515,674 S | | 2/2006 | Liebscher | |
| 7,207,748 B1 | | 4/2007 | Urban | |
| 7,493,728 B2 | * | 2/2009 | Dussault et al. | 52/16 |
| 8,075,765 B2 | * | 12/2011 | Perlatti | 210/162 |
| 2004/0200781 A1 | * | 10/2004 | Shaw et al. | 52/12 |
| 2005/0109693 A1 | * | 5/2005 | Allard | 52/16 |
| 2005/0257433 A1 | * | 11/2005 | Dussault et al. | 52/12 |

(Continued)

*Primary Examiner* — Gregory Huson
*Assistant Examiner* — Nicolas A Arnett
(74) *Attorney, Agent, or Firm* — Montgomery Patent & Design; Robert C. Montgomery

(57) ABSTRACT

An above-ground, structure-mounted rain water collection, storage, and utilization apparatus is herein disclosed, comprising a vertical plastic tank situated along a wall of a structure where downspouts are typically present. Rain water would flow from a downspout into a screened top portion of the tank. Once filled, integral overflow spouts may be utilized to divert excess water to either another apparatus unit, a downspout, or a hose for normal grade level dispersal. The apparatus would be supported by a base structure at grade. The bottom of the tank would be tapered to avoid the collection of silt and would terminate in a conventional spigot valve providing conventional connection to a hose system for subsequent recycled use. The apparatus may also be provided with an alternate in-line pump to provide a pressurized supply of water.

15 Claims, 5 Drawing Sheets

(56) References Cited

U.S. PATENT DOCUMENTS

| | | |
|---|---|---|
| 2006/0101723 A1 | 5/2006 | Baeta |
| 2009/0031625 A1* | 2/2009 | McAvoy et al. ............... 47/48.5 |
| 2009/0178727 A1* | 7/2009 | Murphy .......................... 141/35 |
| 2010/0193046 A1* | 8/2010 | Moroder et al. ............... 137/357 |
| 2010/0199574 A1* | 8/2010 | Perlatti ............................. 52/12 |
| 2010/0200482 A1* | 8/2010 | Perlatti ..................... 210/170.03 |

* cited by examiner

RAIN WATER COLLECTION SYSTEM

RELATED APPLICATIONS

The present invention was first described in and claims the benefit of U.S. Provisional Application No. 61/201,579, filed Dec. 15, 2008, the entire disclosures of which are incorporated herein by reference.

FIELD OF THE INVENTION

The present invention relates generally to rain water collection systems for houses and the like, and in particular, to a rainwater collection cistern system for the simple use of collected water.

BACKGROUND OF THE INVENTION

Many areas of the world rely upon the collection and use of reclaimed precipitation as a primary source of usable water. Cisterns and other devices are utilized for purposes of collecting and storing water runoff from impervious surfaces such as the rooftops of dwellings. While generally unpotable, such systems provide a useful source of water for tasks such as irrigation, washing cars or driveways, and the like.

Many such cisterns and other similar rainwater recollection systems store the water in a stagnant, manually accessed manner. Items such as pails or buckets are often the only means of accessing and transporting the water. As such, the process of utilizing the reclaimed water is often tedious or impossible, thus reducing the efficiency of employing such methods and resulting in the use of municipal wells or other sources of water for many tasks, which in turn eliminates the usefulness and purposes of such cistern systems.

Various attempts have been made to provide a system for the reclamation and subsequent reuse of rainwater. Examples of these attempts can be seen by reference to several U.S. patents. U.S. Pat. No. 2,814,529, issued in the name of Arnt, describes a water dispersing device. The Arnt device is essentially a hose which is adaptable to a downspout of a common roof gutter system, allowing a user to use the precipitating water in a useful manner.

U.S. Pat. No. 5,735,304, issued in the name of Chumley, describes a rainwater collection and distribution apparatus. The Chumley apparatus provides a box-like structure which acts as a rainwater control mechanism by collecting rainwater and dispersing it in a manner which reduces runoff rates and provides infiltration.

U.S. Pat. No. 6,941,702, issued in the name of Abrams et al., describes a rainwater collection and dispensation system. The Abrams system provides an elevated storage device for roof-collected rainwater runoff which incorporates the water into nearby systems to augment water flow to toilet and irrigation systems.

While these devices fulfill their respective, particular objectives, each of these references suffer from one (1) or more of the aforementioned disadvantages. Many such systems do not provide an adequate means for the varied reuse of the collected water according to a user's needs. Also, many such systems are not easily and cheaply retrofittable to existing roof water runoff collection systems. Furthermore, many such systems do not provide adequate storage and pressurizing means to allow a user to use the water in a simple and conventional manner upon collection. Accordingly, there exists a need for a rain water collection system without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a rain water collection system which allows a user to retrofit the system advantageously to adapt to existing conditions and reuse collected water in desired and conventional ways in a simple manner. Thus, the object of the present invention is to solve the aforementioned disadvantages and provide for this need.

To achieve the above objectives, it is an object of the present invention to comprise a rain water collection apparatus which further comprises a base assembly with a base cavity and a tank assembly resting on the base assembly. The base cavity comprises a housing means for portions of the invention and an access door with a latching mechanism.

Another object of the present invention is to comprise the tank assembly of a tank body with a funnel, a screen lid assembly, a cleanout flange connected to the funnel portion, and a spigot valve. The tank assembly is adapted to receive the rain water from an existing gutter system via the screen lid assembly.

Yet still another object of the present invention is to comprise the screen lid assembly of side lid portions which are removably attached to an open upper end of the tank body and an intake screen which covers the entire horizontal top surface of the screen lid assembly. The intake screen is affixed to top edge portions of the vertical side lid portions to form an inlet-grate like structure which receives runoff from an existing gutter system.

Yet still another object of the present invention is to position the spigot valve inside the base cavity, connected to the cleanout flange and extending downward. The spigot valve comprises a valve outlet which is adapted to connect to an existing hose system. The spigot valve further comprises a rotating turn handle. The spigot is used in a conventional manner similar to a common water spigot to allow a user to recycle collected water.

Yet still another object of the present invention is to further comprise a "U"-shaped strap bracket which conforms to the exterior profile of the tank body. The bracket is secured to an existing support wall and around the tank body to help stabilize the apparatus.

Yet still another object of the present invention is to comprise the tank body of a shape such that the tank assembly and base assembly form a continuous vertical profile. The tank body rests upon an upper pedestal surface portion of the base assembly.

Yet still another object of the present invention is to further comprise the tank assembly of a plurality of overflow spouts. Each overflow spout is provided with an installed cap.

Yet still another object of the present invention is to comprise a pump assembly located within the base assembly. The pump assembly is connected to the spigot valve and cleanout flange. The pump assembly comprises an electric pump and an expansion tank which provide a pressurized distribution of the collected rain water, which allows a user to utilize the spigot in a conventional manner similar to a common water spigot.

Yet still another object of the present invention is to provide a method of utilizing the device that provides a unique means of installing the apparatus to work cooperatively with an existing roof rain water collection system, collecting and storing roof rain water runoff, and allowing a user to utilize the stored water in a simple, easy manner suitable for a variety of common tasks which require the use of water.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | rain water collection apparatus |
| 15 | alternate water pressurization apparatus |
| 20 | tank assembly |
| 21 | tank body |
| 24 | funnel portion |
| 25 | cleanout flange |
| 26 | overflow spout |
| 27 | pipe cap |
| 28 | gasket |
| 30 | base assembly |
| 31 | pedestal surface |
| 32 | foot portion |
| 33 | valve outlet |
| 34 | base cavity |
| 35 | access door |
| 36 | spigot valve |
| 37 | hinge |
| 38 | valve handle |
| 39 | latching mechanism |
| 40 | lid assembly |
| 42 | side lid portion |
| 44 | screen |
| 50 | strap bracket |
| 60 | water |
| 70 | gutter system |
| 74 | downspout |
| 76 | level grade surface |
| 90 | pump assembly |
| 91 | pump |
| 92 | expansion tank |
| 94a | tank outlet |
| 94b | pump inlet |
| 94c | pump outlet |
| 94d | valve inlet |
| 95 | power cord |
| 100 | wall structure |
| 120 | hose system |
| 200 | fastener |

DETAILED DESCRIPTION OF THE PREFERRED EMBODIMENT

Figure 3:
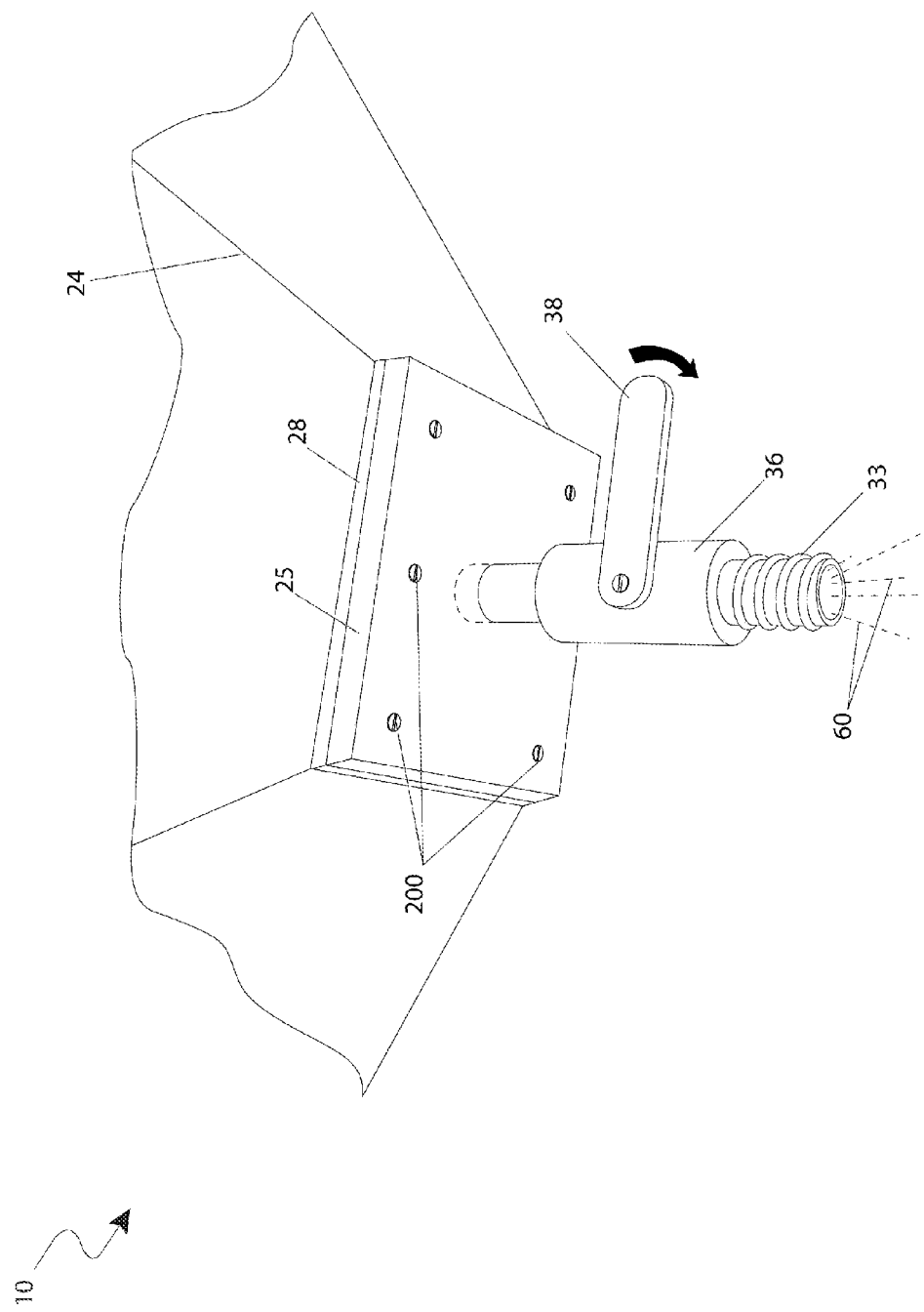
FIG. 3 is a close-up view of a cleanout flange portion 25 of the rain water collection system 10, according to a preferred embodiment of the present invention.
Figure 4:
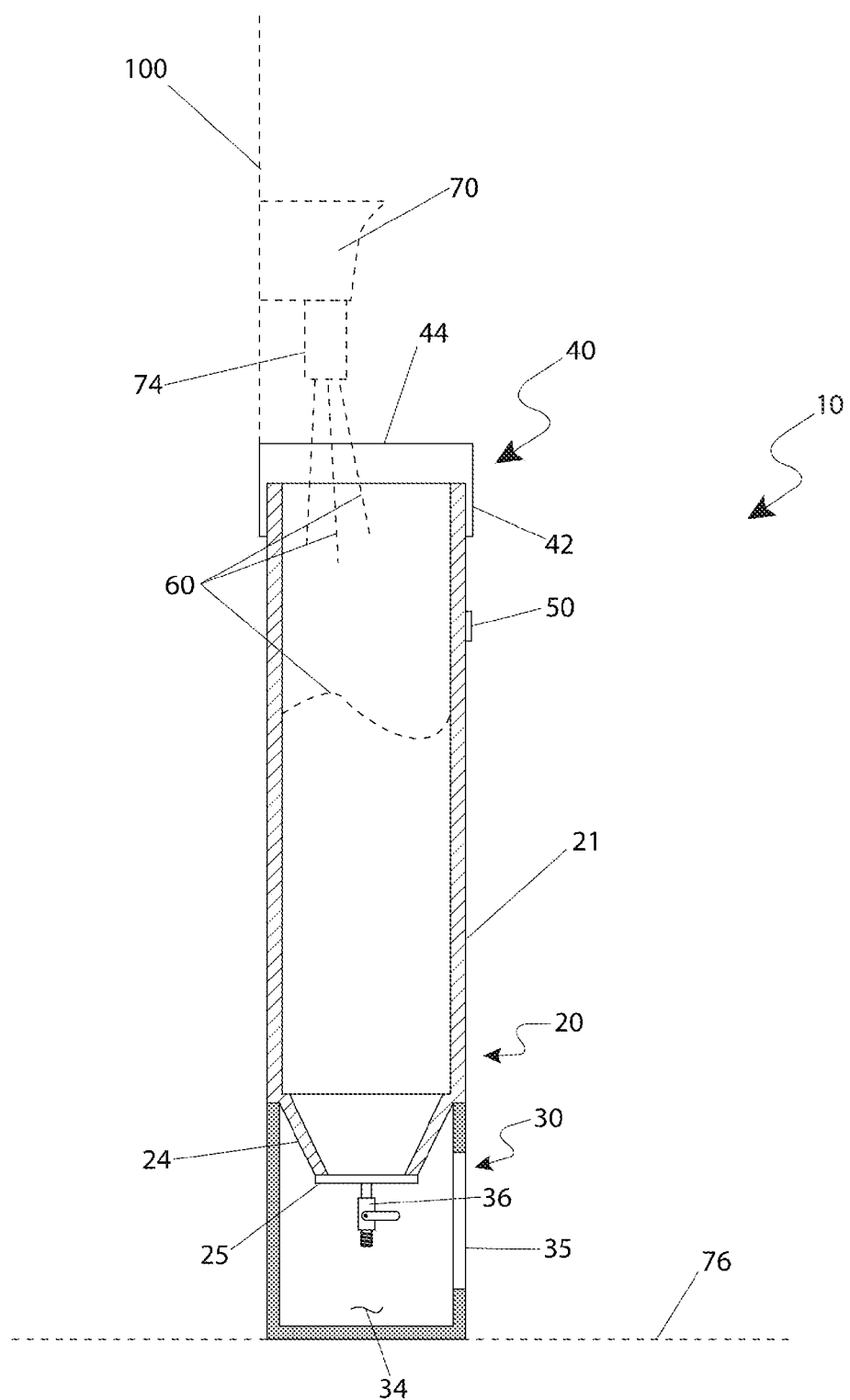
FIG. 4 is a section view of the rain water collection system 10 taken along section line A-A (see FIG. 1), according to a preferred embodiment of the present invention; and, FIG. 5 is a front view of an alternate water pressurization apparatus 15 according to an alternate embodiment of the present invention.
Figure 5:
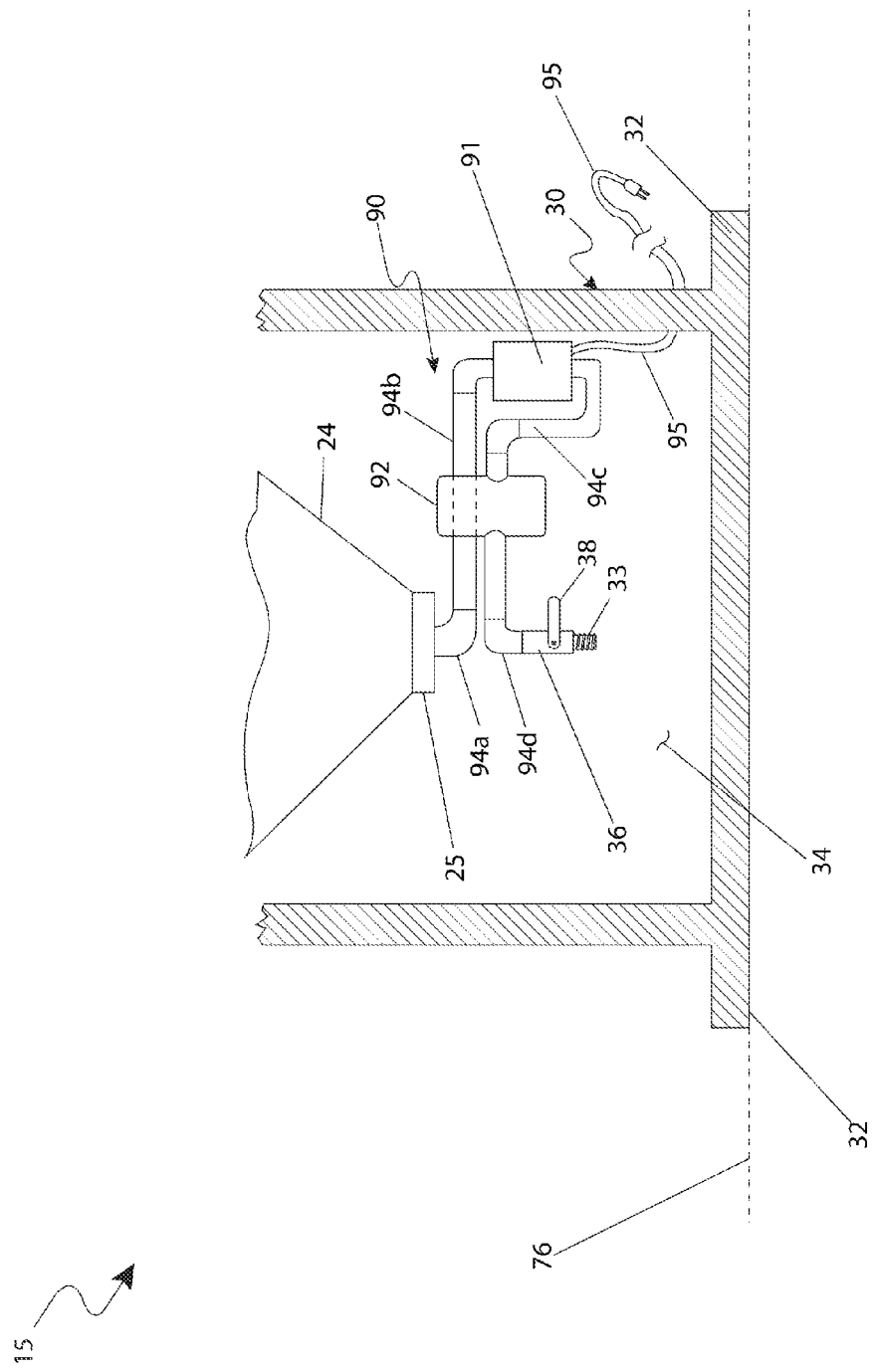

The best mode for carrying out the invention is presented in terms of its preferred embodiment, herein depicted within FIGS. 1 through 4 and in terms of an alternate embodiment as depicted within FIG. 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a rain water collection apparatus (herein described as the "apparatus") 10, which provides an above-ground rain water utilization system for a residence comprising a vertically orientated plastic accumulation tank 20. Rain water 60 would flow into an upper end portion of a tank assembly 20 from a downspout portion 74 of an existing roof gutter system 70. A bottom-mounted spigot valve 36 allows normal dispensing of the water 60 or may be connected thereto a hose system 120 for washing of vehicles and similar tasks. The apparatus 10 is supported at a grade level by a base assembly 30 and is stabilized against a house wall structure 100 using a strap bracket 50.

Figure 1:
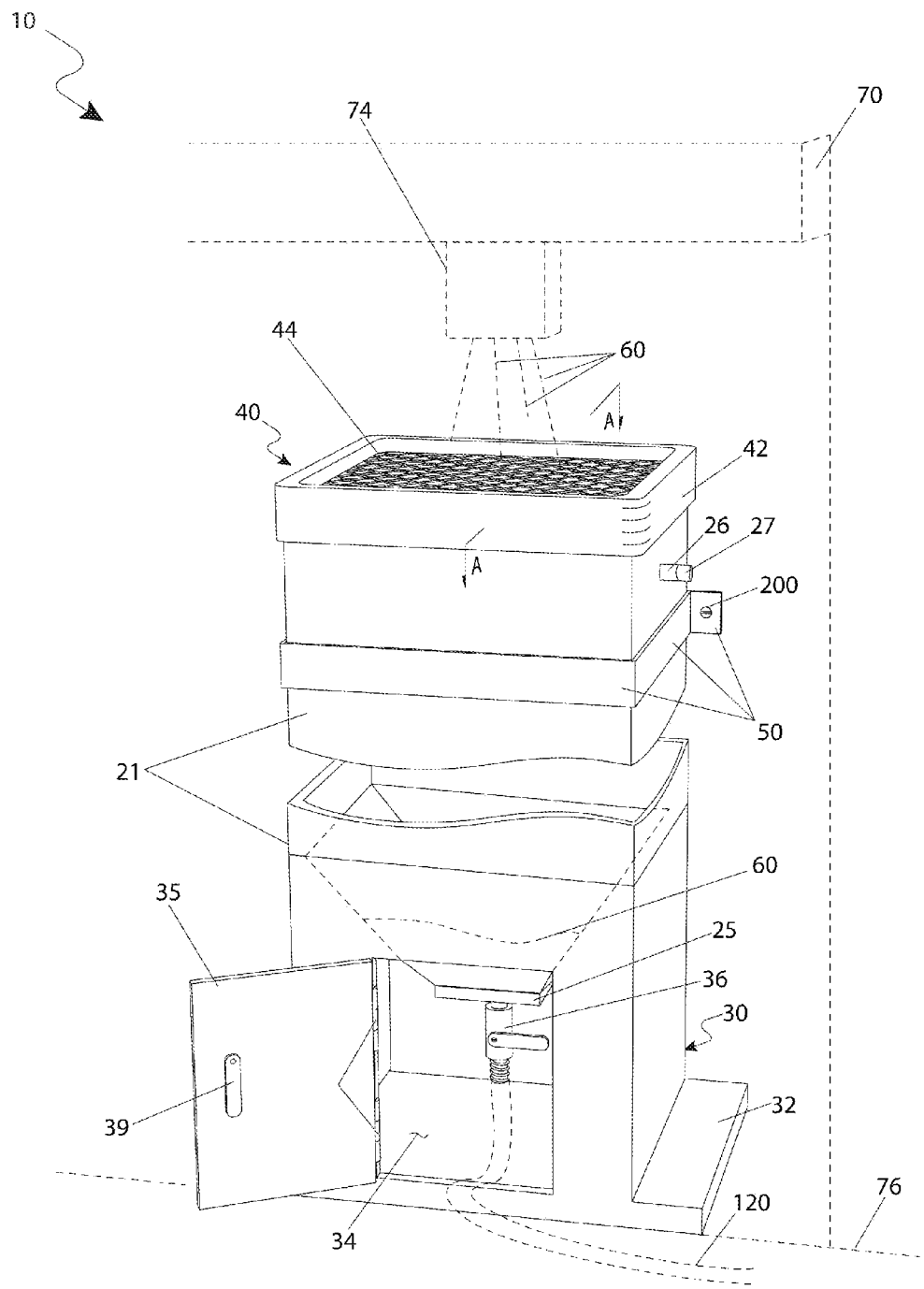
FIG. 1 is an environmental view of a rain water collection system 10, according to a preferred embodiment of the present invention.

Referring now to FIG. 1, an environmental view of the apparatus 10, according to a preferred embodiment of the present invention, is disclosed. The apparatus 10 provides a means of economically and ecologically using a supply of excess rain water 60 collected therefrom an existing gutter system 70 of a wall structure 100 of a house or other building. The apparatus 10 is preferably, but not essentially, located thereat corner locations of a wall structure portion 100 where downspouts 74 are present. Rain water 60 is envisioned to flow therefrom a truncated existing downspout 74 onto a horizontal screened lid portion 40 of the apparatus 10 being mounted thereto top perimeter edges of the tank assembly 20. A bottom portion of the tank assembly 20 is inserted thereinto and supported by the removably attached base assembly 30. The tank assembly 20 is further stabilized using a "U"-shaped strap bracket 50 to fasten an upper end portion of the tank assembly 20 thereagainst the wall structure 100.

The tank assembly 20 further comprises a tank body 21, a funnel portion 24, a cleanout flange 25, and a pair of overflow spouts 26. The tank assembly 20 is supported by the base assembly 30 so as to position the spigot valve 36 approximately two (2) to three (3) feet above a grade surface 76 therewithin a base cavity portion 34 of the base assembly 30. The funnel portion 24 is substantially enclosed within the base cavity portion 34. Manipulation of the valve handle 38 of the spigot valve 36 provides normal dispensing and/or distribution of the collected water 60. Said spigot valve 36 provides a valve outlet 33 having a connecting means thereto a hose system 120 for subsequent recycling of the water 60, such as washing an automobile, watering a lawn, supplying water to an outdoor fountain, or the like.

The base assembly 30 comprises a sturdy hollow rectangular load-bearing structure having an open top portion and a forward facing dispensing base cavity 34. The base cavity 34 further comprises an access door 35 having a latching mechanism 39, thereby providing convenient access thereto the aforementioned spigot valve 36. The base assembly 30 further comprises laterally extending foot portions 32 along a grade surface 76 providing additional stability to the apparatus 10.

The apparatus 10 further comprises a strap bracket 50 which provides a means of securing the tank assembly 20 thereto the wall structure 100 using common fasteners 200 such as lag bolts, wall anchors, screws, or the like. The strap bracket 50 comprises a "U"-shaped plastic or metal form so as to conform thereto an exterior profile of the tank body 21 and are formed at right angles thereat end portions forming fastening ears which contact the wall structure 100 in a parallel manner and are affixed thereto using common fasteners 200 such as bolts, screws, or the like. Although illustrated as an independent member, the strap bracket 50 may also be introduced as an integral molded portion of the tank body 21 without deviating from the concept and as such should not be interpreted as a limiting factor of the present apparatus 10.

It is understood that the apparatus 10 may be positioned thereat additional locations along the house wall structure 100 with equal benefit such as, but not limited to: thereat an intermediate location between downspouts 74, adjacent thereto an existing downspout 74, or along a wall structure 100 having no existing gutter system 70, thereby allowing rain water 60 to enter the lid portion 40 of the apparatus 10 directly.

The tank body 21 further comprises a pair of permanently affixed overflow spouts 26 which extend therefrom opposing upper side portions using common plastic joining methods such as adhesives, welding, or the like. Said overflow spouts 26 comprise common horizontal threaded pipe fittings. Each overflow spout 26 comprises a standard threaded cap 27 installed thereonto allowing a user to utilize either or both overflow spouts 26, or seal said spouts 36 if not needed based upon particular installations. Upon the tank assembly 20 obtaining a full state, said overflow spouts 26 may be utilized to provide a standard plumbing means so as to redirect said overflow water 60 thereinto an adjacent downspout 74, into additional piping, or into a hose system 120, which in turn provides normal grade surface dispersal of the overflow water 60. Additionally, said rain water 60 may be directed by the overflow spouts 26 thereto an additional unit, or units, of the apparatus 10 to provide additional water 60 storage capacity.

The apparatus 10 is envisioned to be introduced in a variety of aesthetically pleasing colors and designs thereby allowing said apparatus 10 to coordinate therewith an appearance of an existing building wall structure 100 to which the apparatus 10 is attached.

Figure 2:
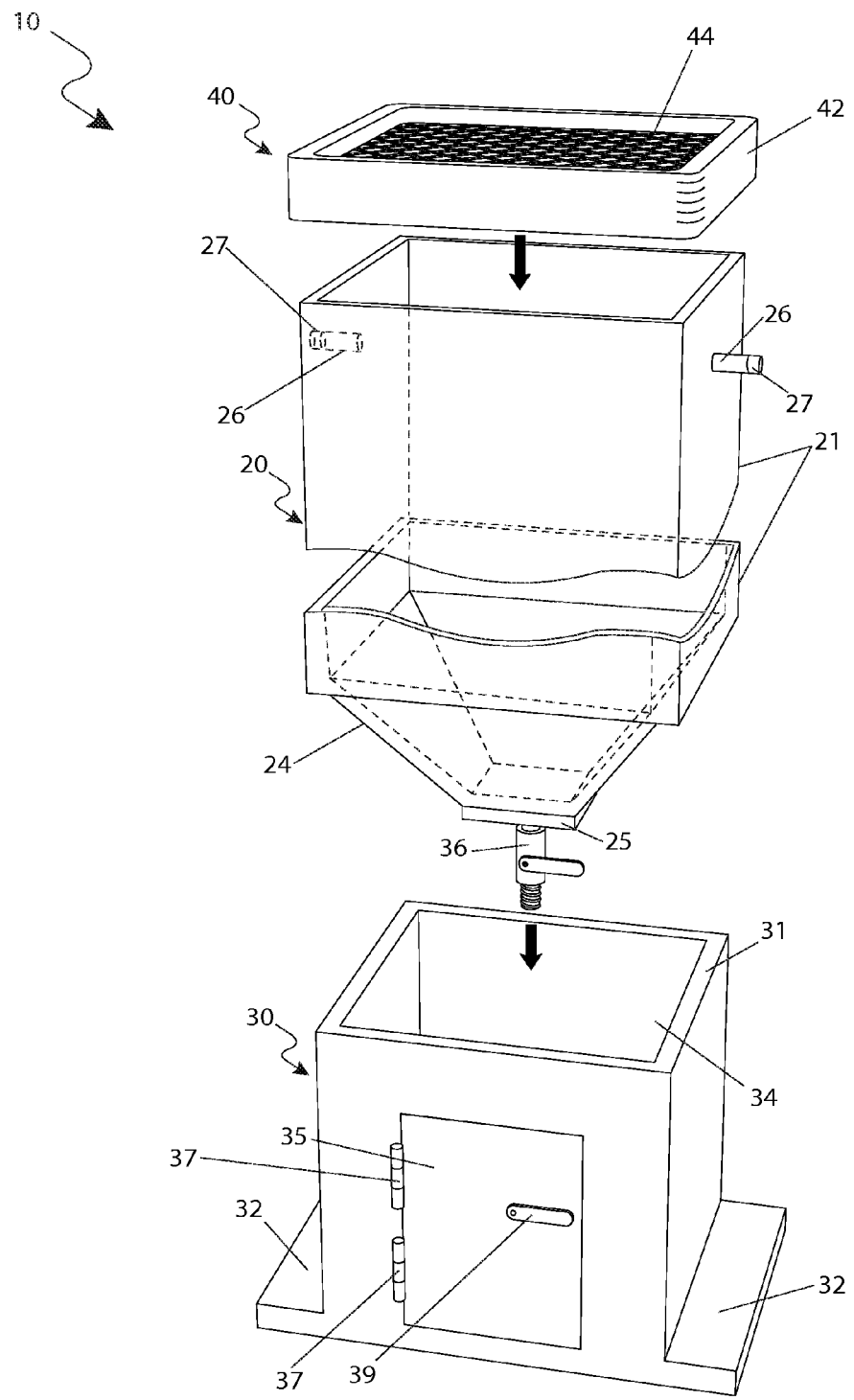
FIG. 2 is an exploded view of the rain water collection system 10, according to a preferred embodiment of the present invention.

Referring now to FIG. 2, an exploded view of the apparatus 10, according to a preferred embodiment of the present invention, is disclosed. The base assembly 30 is envisioned to be made of a durable weather-resistant thermoplastic providing sufficient thickness and weight so as to provide additional stability thereto the apparatus 10.

Said base assembly 30 is to be capable of withstanding an expected weight of the tank assembly 20 and contained collected water 60. The base assembly 30 is envisioned to be placed adjacent thereto an exterior wall of a structure 100 and the tank assembly 20 being rested thereupon an open-top portion of said base assembly 30 resting thereupon a supporting upper pedestal surface portion 31 of the base assembly 30. The upper pedestal surface 31 provides a horizontal perimeter edge approximately two (2) inches wide which supports a matching lower horizontal feature of the tank body 21, thereby allowing the tank assembly 20 and base assembly 30 to form a continuous vertical shape. The base assembly 30 is envisioned to be placed thereon a level grade surface 76 suitable to provide appropriate stability thereto the apparatus 10 thereby minimizing safety concerns. The base assembly 30 further comprises a hollow rectangular internal base cavity 34 which allows access thereto the spigot valve 36 which extends downwardly therefrom the bottom of the cleanout flange portion 25 of the tank assembly 20. The base cavity 34 also provides an enclosed storage area for hoses, common outdoor tools, or the like. The base cavity 34 comprises an access door 35 being affixed thereto a front surface via a pair of common hinges 37 along a vertical edge of the access door 35. The access door 35 provides a security and sanitary means thereto the base assembly 30 as well as an aesthetic appearance.

The tank body portion 21 of the tank assembly 20 is made of a durable weather resistant rigid plastic material such as polypropylene, acrylonitrile butadiene styrene (ABS), or the like, being manufactured using common injection molding or extrusion techniques. The tank body 21 provides a storage means for an amount of collected rain water 60. The storage tank body 21 comprises an elongated vessel having a rectangular cross sectional shape having rounded corners and is to be mounted thereupon the wall structure 100 in a vertical orientation. The tank body 21 comprises dimensions of approximately ten (10) feet in height, eighteen (18) inches in width, and six (6) to eight (8) inches in depth. Although illustrated here having a preferred shape and dimensions, it is understood that the tank body 21 may be introduced in various shapes and dimensions based upon a particular wall structure 100 as well as possible space limitations posed by particular installations, and as such should not be interpreted as a limiting factor of the present apparatus 10.

The tank assembly 20 further comprises a bottom-tapered funnel portion 24, a cleanout flange 25, and a spigot valve 36 having a valve outlet 33, thereby providing an exiting means for the collected water 60. The funnel portion 24 of the tank assembly 20 comprises four (4) converging wall portions to prevent a buildup within the tank assembly 20 of anticipated debris and other particulate matter entering the tank assembly 20 therefrom the gutter system 70. Side portions of the funnel portion 24 converge at a bottom portion and provide an attachment means thereto a cleanout flange 25 using a plurality of stud and nut fasteners 200 (see FIG. 3).

The apparatus 10 further comprises a lid assembly 40 comprising a five (5) sided, open-bottom box structure which is preferably made of a durable weather resistant plastic material similar to the tank assembly 20. The lid assembly 40 comprises vertical side lid portions 42 providing removable attachment thereto an open upper end of the tank body 21 via a slight interference fit. The lid assembly 40 further comprises an intake screen 44 covering an entire horizontal top surface thereof being integrally-molded thereinto or affixed thereto top edge portions of the side lid portions 42, thereby providing an intake access point for said rain water 60. The screen 44 provides appropriately sized openings to strain solid debris and particulate material therefrom the collected water 60. It is further understood that when the apparatus 10 is utilized upon a wall structure 100 having no gutter system 70, said rain water 60 enters the tank assembly 20 being received directly therethrough the screen portion 44 of the lid assembly 40.

Referring now to FIG. 3, a close-up view of a cleanout flange portion 25 of the apparatus 10, according to a preferred embodiment of the present invention, is disclosed. Side portions of the funnel portion 24 converge at a bottom portion comprising a horizontal molded surface which provides a parallel attachment means thereto a cleanout flange 25 being mounted thereto using a plurality of stud and nut fasteners

200. The cleanout flange 25 comprises a removably attached rectangular plastic or metal plate structure further providing a centrally-located threaded plumbing connection thereto the spigot valve 36 extending downwardly therefrom the cleanout flange 25. The cleanout flange 25 provides a means to periodically remove any accumulated debris therewithin the tank assembly 20. The cleanout flange 25 is envisioned to be sealed along a perimeter edge thereto the funnel portion 24 of the tank assembly 20 using a common gasket 28 or equivalent sealing method.

The spigot valve 36 comprises a common ball valve component envisioned to having threaded end portions and a conventional quarter-turn handle 38 to conveniently release the water 60 therewithin the tank assembly 20. Said spigot valve 36 further comprises a threaded valve outlet 33 thereat a lower portion, thereby enabling attachment of a common water distributing hose system 120. The spigot valve 36 is envisioned to comprise an open position which will enable the collected water 60 to exit the tank assembly 20, and a closed position which enables said tank assembly 20 to continue to collect and store said collected water 60.

Referring now to FIG. 4, a section view of the apparatus 10, according to a preferred embodiment of the present invention, is disclosed. The apparatus 10 is illustrated here having a rear panel portion of the tank assembly 20 abutting a wall structure 100 being secured thereto using the strap bracket 50. The bottom of the tank assembly 20 forms an integral funnel portion 24 being tapered so as to avoid the collection of silt and other debris. The bottom located spigot valve 36 has an outlet 33 which provides a means to perform normal dispensing and may be connected thereto a hose system 120 for washing of motor vehicles, watering of lawns and flowers, rinsing of driveways, and the like.

Referring now to FIG. 5, a front view of an alternate water pressurization apparatus 15 according to an alternate embodiment of the present invention, is disclosed. The alternate water pressurization apparatus 15 comprises substantially the same materials and function as the preferred apparatus 10 with particular enhancements including a pump assembly 90 and additional internal plumbing 94*a*, 94*b*, 94*c*, 94*d* located discreetly therewithin the base assembly 30. The base assembly 30 is envisioned to accommodate the pump assembly 90, thereby allowing an easy upgrade from the apparatus 10 to the alternate water pressurization apparatus 15, if desired. The pump assembly 90 is envisioned to be similar to other commercially available inline fluid pumping mechanisms used therewith fluid plumbing systems such as wells and the like. The pump assembly 90 is envisioned to comprise expected features common to other water pumping systems such as, but not limited to: an electric pump 91, an expansion tank 92, an internal pressure switch, an electric power cord 95, and the like. The pump 91 is envisioned to cycle as necessary to maintain pressure therewithin the expansion tank 92 in order to provide a pressurized distribution of collected water 60. The alternate water pressurization apparatus 15 generally comprises a primary gravity fed water supply via the previously described tank assembly 20 and a secondary pressurized water means via the pump assembly 90. The alternate water pressurization apparatus 15 further comprises various plumbing and fittings 94*a*, 94*b*, 94*c*, 94*d* required to interconnect the cleanout flange 25, the pump 91, the expansion tank 92, and the spigot valve 36, thereby providing a means to connect a pressurized water supply 60 thereto a water distribution system such as a hose system 120 or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 3.

The method of installing and utilizing the apparatus 10 may be achieved by performing the following steps: determining a location to place the apparatus 10 being adjacent thereto a building wall structure 100 with an associated gutter system 70; ensuring said ground surface 76 is level to provide a stable surface on which to rest the base assembly 30; placing the base assembly 30 thereon the designated location; placing the tank assembly 20 thereon the pedestal surface portion 31 of the base assembly 30; attaching the strap bracket 50 therearound the tank body 21 and thereto the wall structure 100 using the fasteners 200; attaching the lid 40 thereto a top edge of the tank body portion 21 of the tank assembly 20; positioning a portion of an existing downspout portion 74 of the gutter system 70 thereabove the screen portion 44 of the lid assembly 40; threadably attaching the spigot valve 36 thereto the cleanout flange 25, if not previously installed; allowing run-off rain water 60 to drain therefrom the gutter system 70 thereinto the tank assembly 20 via the screen portion 44 of the lid assembly 40 and be collected therein; connecting one (1) or both overflow spouts 26 thereto a water dispersing means such as an adjacent downspout 74, a hose system 120, or the like, if desired; attaching a hose system 120 thereto an outlet 33 of the spigot valve 36 to direct collected water 60 thereto a desired location; opening the spigot valve 36; using the collected water 60 in a normal manner for washing an automobile, watering a lawn, supplying water to an outdoor fountain, or the like; closing the spigot valve 36; removing the water distribution device; and, benefiting from responsible water conservation and economic savings afforded a user of the present apparatus 10.

The method of utilizing the alternate water pressurization apparatus 15 may be achieved by performing substantially similar steps as described for the apparatus 10 with the following particular additional steps: connecting the cleanout flange 25 thereto the pump assembly 90 using the provided standard pipe fittings 94*a*, 94*b*, 94*c*, 94*d* therebetween said cleanout flange 25, the pump 91, the expansion tank 92, and the spigot valve 36; allowing run-off rain water 60 to drain thereinto the tank assembly 20 via the gutter system 70 and downspout 74 as previously described; allowing the pump 91 to automatically provide a pressurized water supply 60 for various uses; and, benefiting from the economic savings, convenience, and increased water pressure afforded a user of the alternate water pressurization apparatus 15.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A rain water collection apparatus for using rain water discharged from an existing gutter system, said rain water collection apparatus comprising:
   a base assembly having a base cavity formed therein; and,
   a tank assembly rested on said base assembly, said tank assembly adapted to receive the rain water from the existing gutter system, said tank assembly comprising:
      a tank body having a funnel;
      a screen lid assembly provided with side lid portions removably attached to an open upper end of said tank body;
      a cleanout flange connected to said funnel; and,
      a spigot valve connected to said cleanout flange and extending downwardly therefrom;
   wherein said funnel is substantially enclosed within said base cavity.

2. The rain water collection apparatus of claim 1, wherein said screen lid assembly comprises: an intake screen covering an entire horizontal top surface of said screen lid assembly and being affixed to top edge portions of said side lid portions.

3. The rain water collection apparatus of claim 1, wherein said base cavity includes an access door having a latching mechanism connected thereto.

4. The rain water collection apparatus of claim 1, wherein said spigot valve is positioned within said base cavity, said spigot valve having a valve outlet adapted to be connected to an existing hose system for subsequent recycling of the rain water, said spigot valve further having a turn handle rotatably attached thereto.

5. The rain water collection apparatus of claim 1, further comprising: a "U"-shaped strap bracket conforming to an exterior profile of said tank body and adapted to secure said tank assembly to a support wall.

6. The rain water collection apparatus of claim 1, further comprising: a plurality of overflow spouts each provided with a cap installed thereon, said tank assembly resting upon an upper pedestal surface portion of said base assembly such that said tank assembly and said base assembly form a continuous vertical shape.

7. The rain water collection apparatus of claim 1, further comprising: a pump assembly located within said base assembly, said pump assembly being interconnected to said spigot valve and said cleanout flange respectively, said pump assembly including an electric pump and an expansion tank connected thereto for providing a pressurized distribution of the collected rain water.

8. A method of utilizing a rain water collection apparatus for using rain water discharged from an existing gutter system, said method comprising the steps of:
   providing a base assembly having a base cavity formed therein;
   providing and resting a tank assembly on said base assembly by performing the following sub-steps:
      providing a tank body having a funnel portion provided with a plurality of downwardly converging wall portions;
      providing a screen lid assembly having an open-bottom structure provided with side lid portions removably attached to an open upper end of said tank body;
      providing and connecting a cleanout flange to said funnel portion; and,
      providing and connecting a spigot valve to said cleanout flange such that said spigot valve extends downwardly from said cleanout flange;
   said tank assembly receiving the rain water from the existing gutter system; and,
   subsequently utilizing said rain water collected in said tank assembly.

9. A rain water collection apparatus for using rain water discharged from an existing gutter system, said rain water collection apparatus comprising:
   a base assembly having a base cavity formed therein; and,
   a tank assembly rested on said base assembly, said tank assembly adapted to receive the rain water from the existing gutter system, said tank assembly comprising:
      a tank body having a funnel portion provided with a plurality of downwardly converging wall portions;
      a screen lid assembly having an open-bottom structure provided with side lid portions removably attached to an open upper end of said tank body;
      a cleanout flange connected to said funnel portion; and,
      a spigot valve connected to said cleanout flange and extending downwardly therefrom;
   wherein said funnel portion is substantially enclosed within said base cavity.

10. The rain water collection apparatus of claim 9, wherein said screen lid assembly comprises: an intake screen covering an entire horizontal top surface of said screen lid assembly and being affixed to top edge portions of said side lid portions.

11. The rain water collection apparatus of claim 9, wherein said base cavity includes an access door having a latching mechanism connected thereto.

12. The rain water collection apparatus of claim 9, wherein said spigot valve is positioned within said base cavity, said spigot valve having a valve outlet adapted to be connected to an existing hose system for subsequent recycling of the rain water, said spigot valve further having a turn handle rotatably attached thereto.

13. The rain water collection apparatus of claim 9, further comprising: a "U"-shaped strap bracket conforming to an exterior profile of said tank body and adapted to secure said tank assembly to a support wall.

14. The rain water collection apparatus of claim 9, further comprising: a plurality of overflow spouts each provided with a cap installed thereon, said tank assembly resting upon an upper pedestal surface portion of said base assembly such that said tank assembly and said base assembly form a continuous vertical shape.

15. The rain water collection apparatus of claim 9, further comprising: a pump assembly located within said base assembly, said pump assembly being interconnected to said spigot valve and said cleanout flange respectively, said pump assembly including an electric pump and an expansion tank connected thereto for providing a pressurized distribution of the collected rain water.

* * * * *